P. H. JOHNSON.
MEANS OF SUSPENSION OF VEHICLES.
APPLICATION FILED SEPT. 1, 1920.

1,404,966.

Patented Jan. 31, 1922.
7 SHEETS—SHEET 1.

Inventor:
Philip Henry Johnson
By his Attorneys
Baldwin & Wight

P. H. JOHNSON.
MEANS OF SUSPENSION OF VEHICLES.
APPLICATION FILED SEPT. 1, 1920.

1,404,966.

Patented Jan. 31, 1922.

7 SHEETS—SHEET 2.

Inventor:
Philip Henry Johnson,
By his Attorneys,
Baldwin Wright

P. H. JOHNSON.
MEANS OF SUSPENSION OF VEHICLES.
APPLICATION FILED SEPT. 1, 1920.

1,404,966.

Patented Jan. 31, 1922.

7 SHEETS—SHEET 3.

Inventor:
Philip Henry Johnson,
By his Attorneys,
Baldwin & Wight

P. H. JOHNSON.
MEANS OF SUSPENSION OF VEHICLES.
APPLICATION FILED SEPT. 1, 1920.

1,404,966.

Patented Jan. 31, 1922.

7 SHEETS—SHEET 4.

Inventor:
Philip Henry Johnson,
By his Attorneys,
Baldwin & Wight

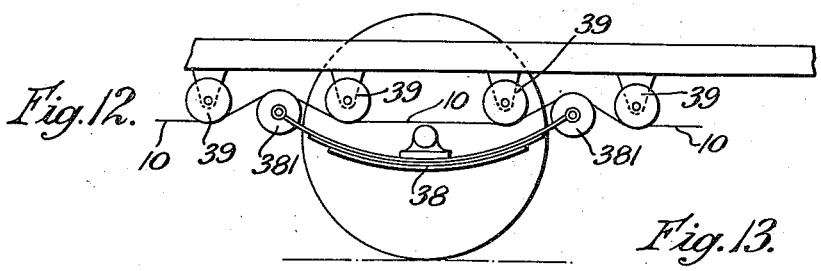
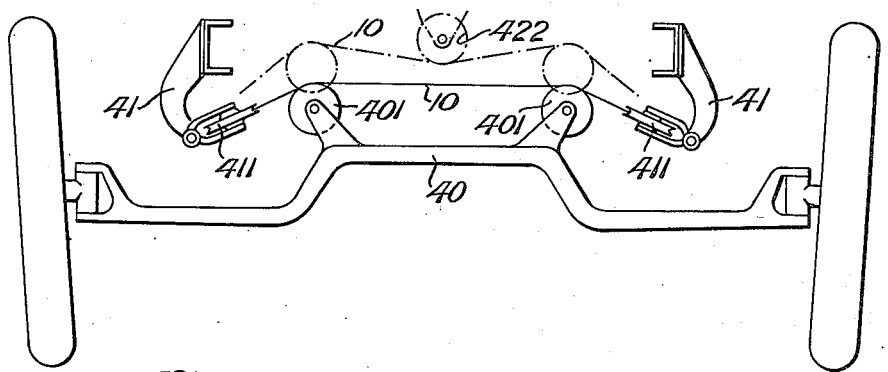
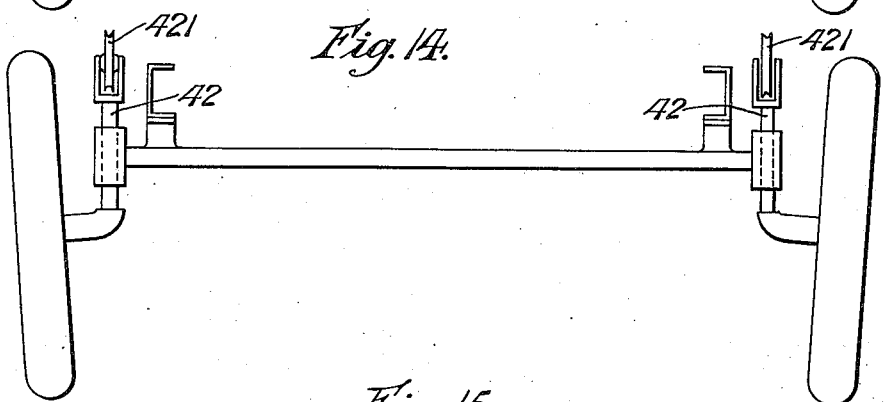
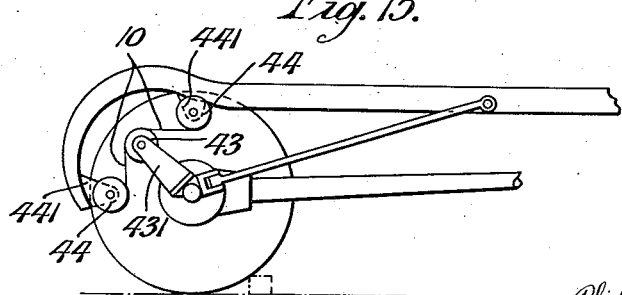

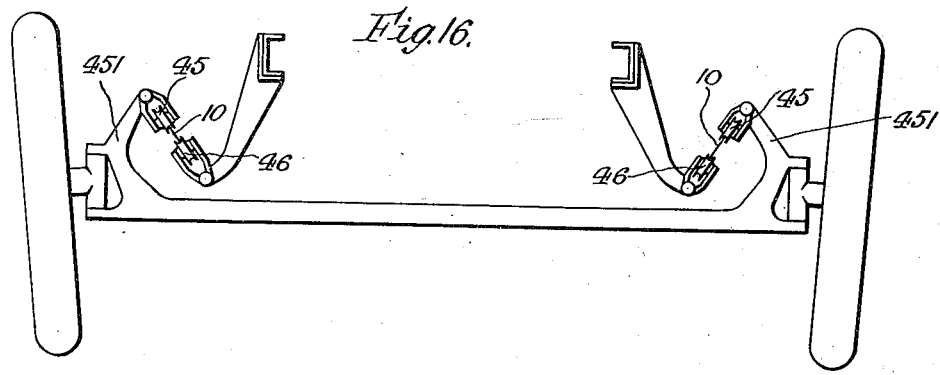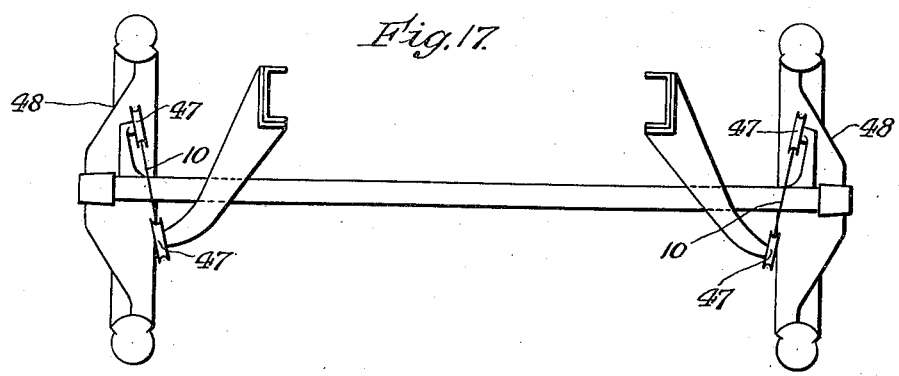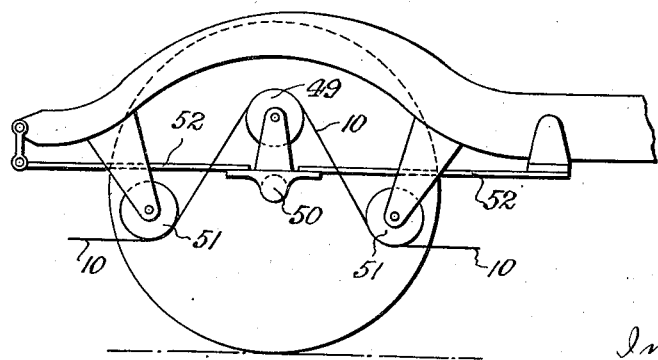

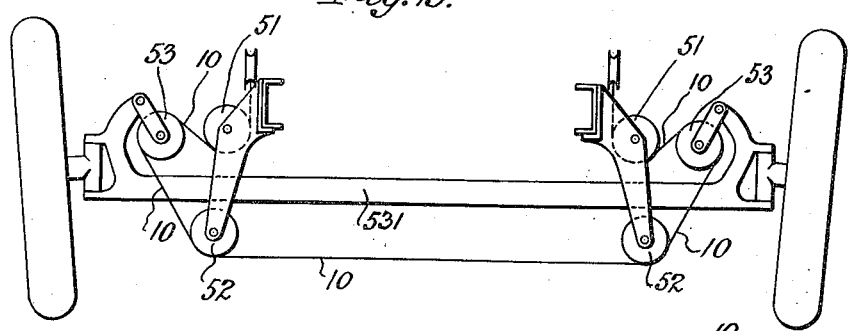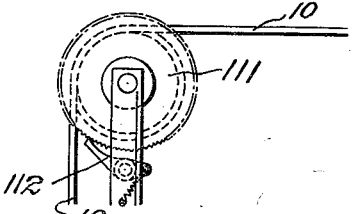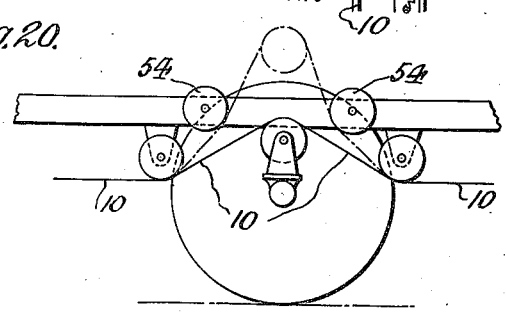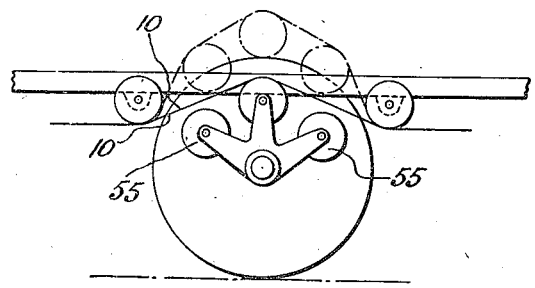

UNITED STATES PATENT OFFICE.

PHILIP HENRY JOHNSON, OF BECKENHAM, ENGLAND.

MEANS OF SUSPENSION OF VEHICLES.

1,404,966.  Specification of Letters Patent.  Patented Jan. 31, 1922.

Application filed September 1, 1920. Serial No. 407,555.

*To all whom it may concern:*

Be it known that I, PHILIP HENRY JOHNSON, a subject of the King of Great Britain, residing at St. Barnabas Vicarage, Beckenham, in the county of Kent, England, have invented a new and useful Improvement in Means of Suspension of Vehicles, of which the following is a specification.

This invention relates to means of suspension of vehicles, as described in the specification of my former Patent No. 1329769.

According to this invention a suspension rope passes over pulleys on the wheel axles or on bogie trucks and under pulleys on the frame of the vehicle. Similarly the suspension rope may pass along both sides of the vehicle and either or both ends; in the latter case the rope may be endless. Or the rope after passing over a pulley on the axle and under a pulley on the frame passes to the other side of the vehicle under a pulley on the vehicle and over a pulley on the other end of the axle; the rope may be secured to the vehicle on each side or may be endless.

In these cases pulleys on the vehicle may be provided on each side of the pulleys carried by the axles, and the distance of the pulleys on the vehicle from the axle is arranged according to the load on the axle.

The pulleys may be mounted directly on the axles or on brackets fixed or pivoted near to the ends or centre of the axles. The pulleys may be mounted on radius rods or springs by which the axles are connected to the frame of the vehicle. Supplementary pulleys may be provided either on the vehicle or on the axles which pulleys engage with the suspension rope when the vehicle moves towards the axle.

In all arrangements the rope may be divided and its ends secured to springs which are so arranged that the tension of the rope may be easily altered.

The annexed drawings illustrate means of suspension in accordance with this invention.

Figure 1:
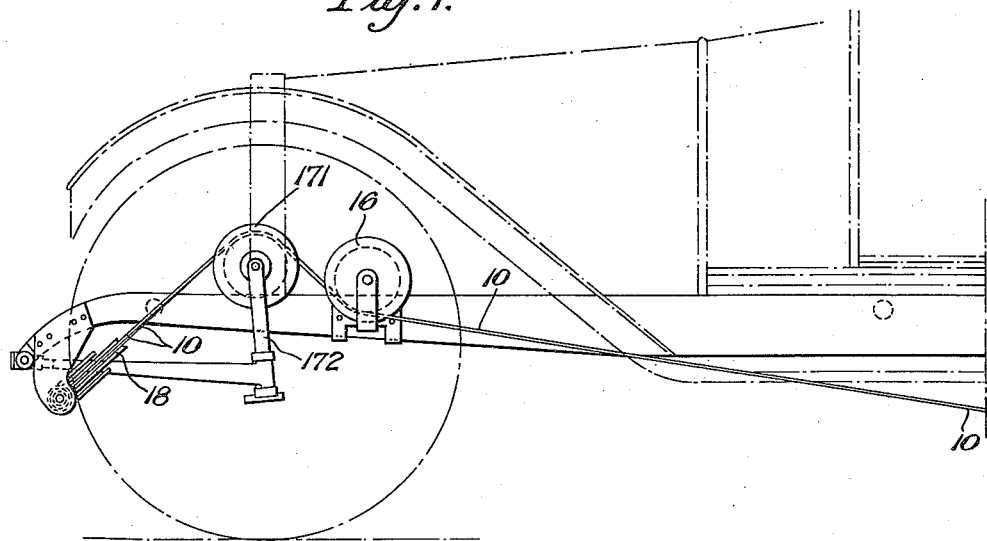
Figure 1:
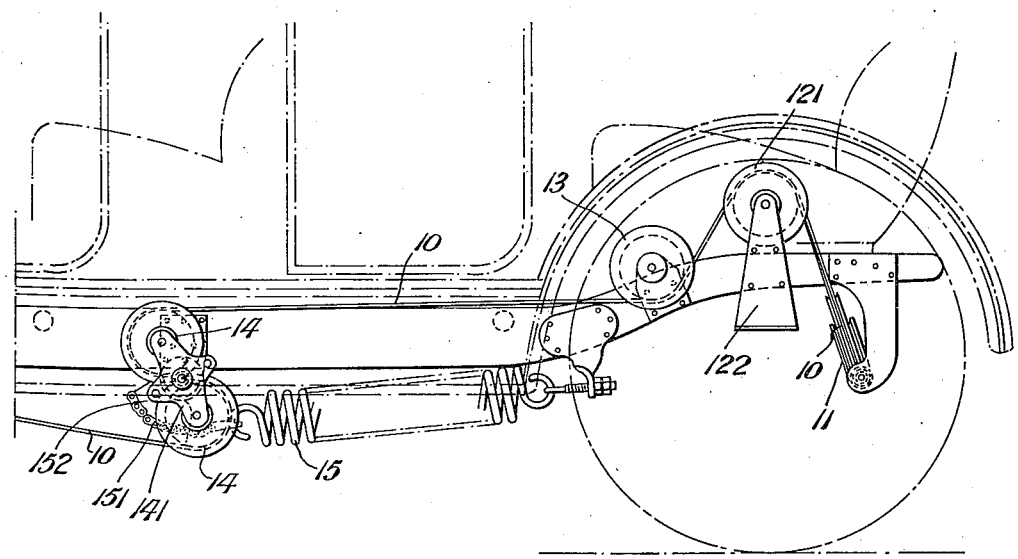
Figure 2:
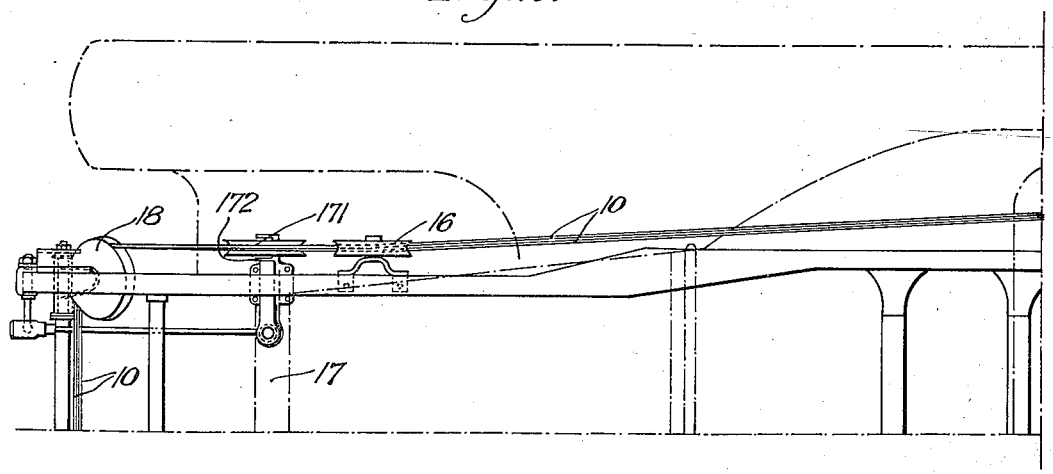
Figure 2:
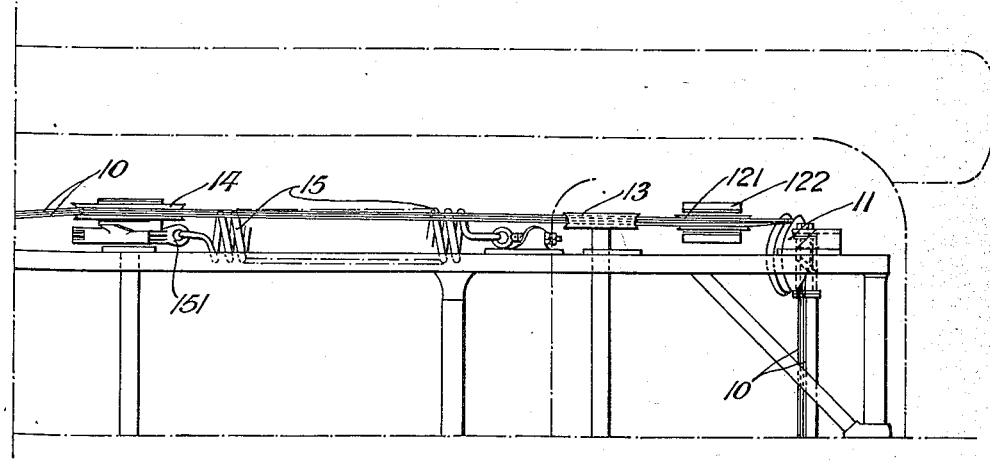
Figure 3:
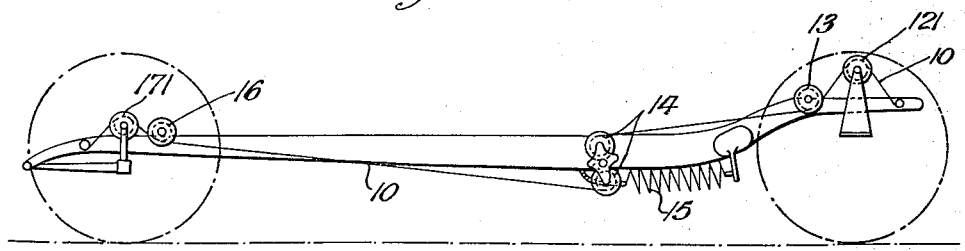
Figure 4:
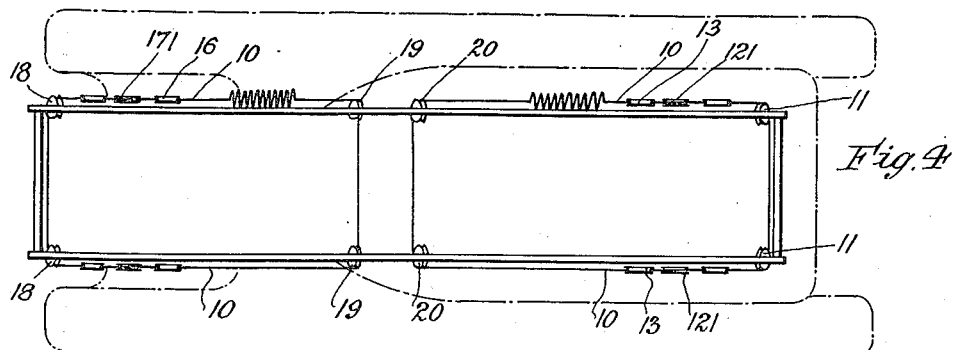
Figure 5:
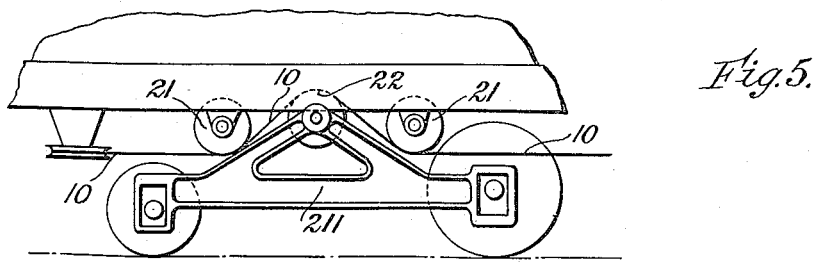
Figure 6:
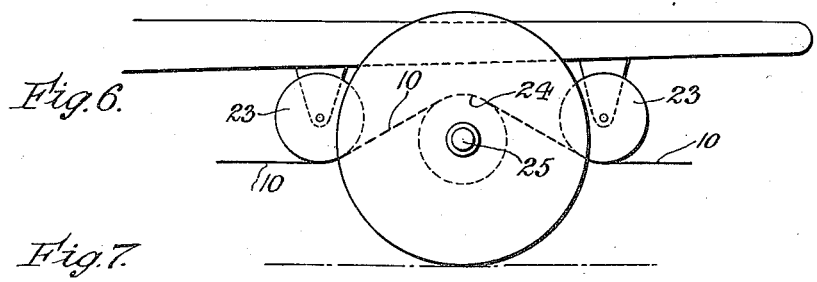
Figure 7:
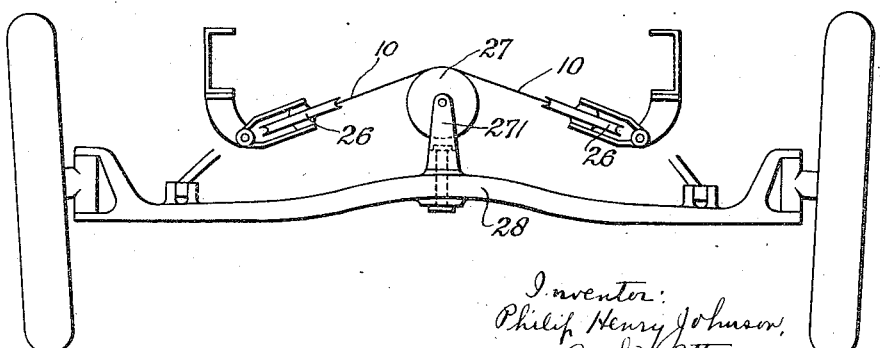
Figure 8:
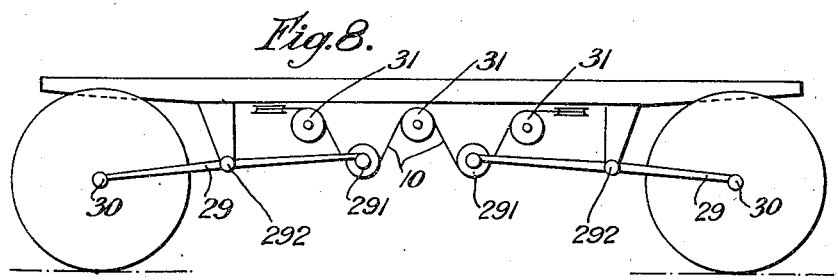
Figure 9:
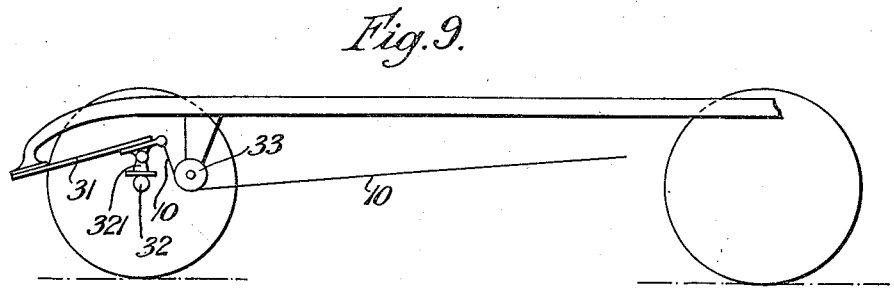
Figure 10:
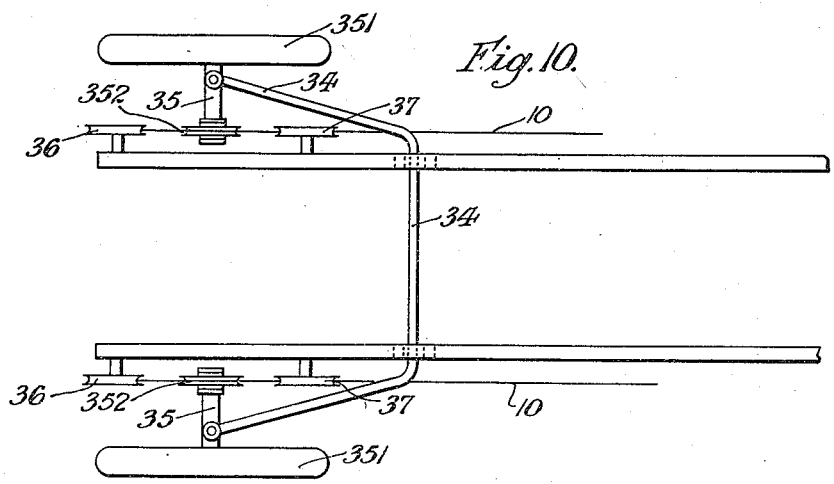
Figure 11:
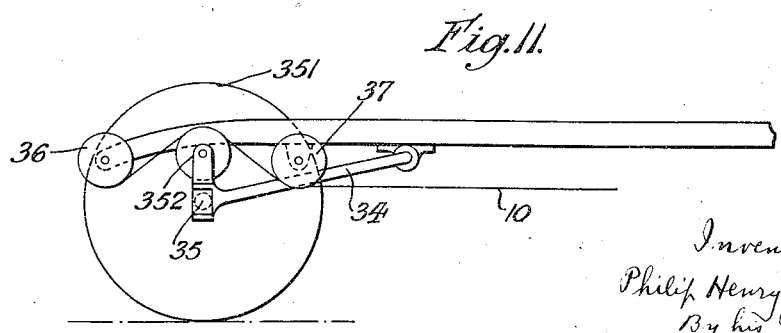

Figure 1 is a left hand side elevation and Figure 2 a part plan in which two endless suspension ropes run round pulleys on the vehicle and the axles. Figure 3 is an elevation showing the ropes fixed at each end of the frame and Figure 4 is a plan showing an alternative arrangement of the ropes. Figure 5 shows a vehicle mounted on bogie trucks. Figure 6 shows an axle forming a bearing for a pulley. Figure 7 shows a pulley mounted on the centre of the axle. Figure 8 shows a pulley mounted on the end of a radius rod. Figure 9 shows the suspension rope attached to a radius rod. Figure 10 is a plan and Figure 11 is a side elevation of an arrangement in which a pulley is carried by the axle pivot. Figure 12 shows pulleys mounted on the ends of a spring carried by the axle. Figure 13 shows pulleys mounted on shackles on the frame. Figure 14 shows pulleys carried by the axle pivot. Figure 15 shows a pulley mounted on an arm on the axle. Figure 16 shows pulleys carried by shackles on the frame and on the axle. Figure 17 shows an arrangement in which disc wheels are used. Figure 18 shows springs combined with a suspension rope. Figure 19 shows a modification of the arrangement shown in Figure 13. Figures 20 and 21 show the use of extra pulleys. Figure 22 shows a detail.

With reference to Figures 1 and 2, Figure 1 shows a left hand side view of a vehicle, and the right hand side may either be similar or the tension compensating mechanism and springs may be omitted.

Two ropes 10, 10, pass under a pulley 11 on the frame of the vehicle over a pulley 121 on a bracket 122 on the axle under a pulley 13 on the frame round pulleys 14, 14, on the ends of a star piece 141 which is pivoted to the frame and connected to a spring 15 by a chain 151 passing over a cam 152. By means of this mechanism the tension on the ropes is maintained. After passing round the pulleys 14 the ropes 10 pass under a pulley 16 on the frame over a pulley 171 on a bracket 172 on the axle 17 and round a pulley 18 on the frame and thence to the other side of the frame.

As shown in Figure 22, one of the pulleys 11 has a ratchet wheel 111 fixed to one of its flanges and a pawl 112 engages with the teeth of the ratchet wheel 111 preventing the pulley 11 from turning in one direction, thereby causing the suspension ropes 10 to creep, whereby the life of the ropes is prolonged.

The ropes 10 instead of passing to the other side of the frame may be secured to the frame at each end as shown in Figure 3 or the ropes 10 may be divided, each of the ends being led to the other side of the frame over pulleys 19 and 20 (as illustrated in Figure 4) respectively.

In Figure 5 the suspension rope 10 passes under pulleys 21 on the frame and over a pulley 22 on a bogie truck 211.

In Figure 6 the suspension rope 10 passes under pulleys 23 on the frame and over a pulley 24 mounted directly on the axle 25 which forms a bearing for the pulley.

In Figure 7 the suspension rope 10 passes under pulleys 26 on the frame and over a pulley 27 mounted on a bracket 271 fixed to the centre of the axle 28.

In Figure 8 the suspension rope 10 passes under pulleys 291 at the end of radius rods 29 pivoted at 292 and connected to the axles 30 and over pulleys 31 on the frame.

In Figure 9 the suspension rope 10 is attached to the end of a radius rod 31 pivoted to a bracket 321 on the axle 32 and passes under a pulley 33 on the frame.

In Figures 10 and 11 the axle 34 is pivoted to short shafts 35 on which the wheels 351 are mounted and which carry pulleys 352, the suspension rope 10 passes over the pulleys 352 and under pulleys 36 and 37 on the frame.

In Figure 12 a leaf spring 38 carries pulleys 381 over which the suspension rope 10 passes also passing under pulleys 39 on the frame.

In Figure 13 the suspension rope 10 passes over pulleys 401 on the axle 40 and under pulleys 411 carried by shackles 41 on the frame. On the frame is a supplementary pulley 422 which engages with the suspension rope when the frame has moved towards the axle.

In Figure 14 pulleys 421 are carried by the axle pivots 42.

In Figure 15 pulleys 43 are carried by shackles 431 on the axle and pulleys 44 are carried by shackles 441 on the frame.

In Figure 16 pulleys 45 at the ends of the axle are mounted on arms 451 inclined from the vertical, the suspension rope 10 passes over the pulleys 45 and under pulleys 46 on the frame, such arrangement tending to absorb shocks in the direction of the movement of the vehicles.

In Figure 17 pulleys 47 are mounted on the axle near the median plane of the disc wheels 48.

In Figure 18 the suspension rope 10 passes over a pulley 49 on the axle 50 and under pulleys 51 on the frame whilst the axle 50 is connected to the frame by springs 52.

In Figure 19 a suspension rope 10 passes under pulleys 51 and 52 on brackets on each side of the frame and over pulleys 53 on each end of the axle 531.

In Figure 20 extra pulleys 54, 54, are provided on the frame which come into action as shown in dotted lines when the frame approaches the axle.

Similarly in Figure 21 extra pulleys 55, 55, are provided on a bracket carried by the axle which pulleys come into action as shown in dotted lines when the frame approaches the axle.

The drawings show rotary pulleys but non-rotary pulleys or equivalent rope guides may of course be employed.

What I claim is:—

1. A vehicle having axles provided with wheels for running on the ground, pulleys on the axles, other pulleys on the frame of the vehicle and a suspension rope passing over the pulleys on the axles and under the pulleys on the frame.

2. A vehicle having axles provided with wheels for moving on the ground, brackets at the ends of the axles, pulleys on the brackets, other pulleys on the frame of the vehicle and a suspension rope passing over the pulleys on the brackets and under the pulleys on the frame.

3. A vehicle having beneath it supports provided with wheels adapted to run on the ground, pulleys on the supports, other pulleys on the frame of the vehicle and an endless suspension rope passing across the pulleys and to both sides of the vehicle.

4. A vehicle having beneath it supports provided with wheels adapted to run on the ground, pulleys on the supports, other pulleys on the frame of the vehicle, a suspension rope passing across the pulleys and extra pulleys adapted to engage the rope.

5. A vehicle having beneath it supports provided with wheels adapted to run on the ground, pulleys on the supports, other pulleys on the frame of the vehicle, an endless suspension rope passing across the pulleys and to both sides of the vehicle and extra pulleys adapted to engage the rope.

6. A vehicle having beneath it supports provided with wheels adapted to run on the ground, pulleys on the supports, other pulleys on the frame of the vehicle, an endless suspension rope passing across the pulleys and to both sides of the vehicle, and means for causing the rope to creep round the vehicle.

7. A vehicle having beneath it supports provided with wheels adapted to run on the ground, pulleys on the supports, other pulleys on the frame of the vehicle, an endless suspension rope passing across the pulleys and to both sides of the vehicle, extra pulleys adapted to engage the rope and means for causing the rope to creep round the vehicle.

8. A vehicle having beneath it supports provided with wheels adapted to run on the ground, pulleys on the supports, other pulleys on the frame of the vehicle, a suspension rope passing across the pulleys and a spring adapted to maintain tension on the rope.

9. A vehicle having beneath it supports provided with wheels adapted to run on the ground, pulleys on the supports, other pulleys on the frame of the vehicle, an endless suspension rope passing across the pulleys and to both sides of the vehicle and a spring adapted to maintain tension on the rope.

10. A vehicle having beneath it supports provided with wheels adapted to run on the ground, pulleys on the supports, other pulleys on the frame of the vehicle, a suspension rope passing across the pulleys, extra pulleys adapted to engage the rope and a spring adapted to maintain tension on the rope.

11. A vehicle having beneath it supports provided with wheels adapted to run on the ground, pulleys on the supports, other pulleys on the frame of the vehicle, an endless suspension rope passing across the pulleys and to both sides of the vehicle, means for causing the rope to creep round the vehicle and a spring adapted to maintain tension on the rope.

12. A vehicle having beneath it supports provided with wheels adapted to run on the ground, pulleys on the supports, other pulleys on the frame of the vehicle, a star piece pivoted to the frame, a cam, a chain passing over the cam and connected to a spring, pulleys on the star piece and a suspension rope passing across the pulleys.

In testimony that I claim the foregoing as my invention I have signed my name this nineteenth day of August, 1920.

PHILIP HENRY JOHNSON.